US011046296B2

(12) United States Patent
Uehara (10) Patent No.: US 11,046,296 B2
(45) Date of Patent: Jun. 29, 2021

(54) CALIPER BRACKET OF VEHICLE DISK BRAKE

(71) Applicant: NISSIN KOGYO CO., LTD., Tomi (JP)

(72) Inventor: Kazumasa Uehara, Tomi (JP)

(73) Assignee: NISSIN KOGYO CO., LTD., Nagano (JP)

( * ) Notice: Subject to any disclaimer, the term of this patent is extended or adjusted under 35 U.S.C. 154(b) by 0 days.

(21) Appl. No.: 16/587,945

(22) Filed: Sep. 30, 2019

(65) Prior Publication Data

US 2020/0101960 A1 Apr. 2, 2020

(30) Foreign Application Priority Data

Oct. 2, 2018 (JP) .............................. JP2018-187526
Aug. 9, 2019 (JP) .............................. JP2019-147057

(51) Int. Cl.
*B60T 17/08* (2006.01)
*F16D 65/00* (2006.01)
(Continued)

(52) U.S. Cl.
CPC ........ *B60T 17/088* (2013.01); *F16D 65/0075* (2013.01); *F16D 65/095* (2013.01);
(Continued)

(58) Field of Classification Search
CPC ........... B60T 17/088; F16D 2055/0016; F16D 65/095; F16D 65/0075; F16D 2250/0084
See application file for complete search history.

(56) References Cited

U.S. PATENT DOCUMENTS 4,667,761 A * 5/1987 Takayanagi ............... B62L 1/00
 180/217
6,450,301 B1 * 9/2002 Iizuka ..................... B60T 1/065
 180/219
(Continued)

FOREIGN PATENT DOCUMENTS

EP 3301319 9/2017
JP 11291969 10/1999
(Continued)

OTHER PUBLICATIONS

European Office Action and Search Report for EP Application No. 19201039.5 dated Mar. 9, 2020, 11 pages.

*Primary Examiner* — Pamela Rodriguez
(74) *Attorney, Agent, or Firm* — Andrew M. Calderon; Roberts Calderon Safran & Cole, P.C.

(57) ABSTRACT

A caliper bracket of a vehicle disk brake includes an axle coupling part, an extension part, a caliper attaching part and a swing arm coupling part. The axle coupling part is disposed on an opposite side to a disk rotor and is attached to a rear wheel axle passing through a center of the disk rotor. The extension part is extending from the axle coupling part. The swing arm coupling part is provided on the other side part of the extension part in the longitudinal direction and is coupled to a swing arm. The extension part is formed to linearly extend from the axle coupling part, and the swing arm coupling part is formed to have a cuboid shape protruding toward the opposite side to the disk rotor and capable of fitting with a coupling groove member provided for the swing arm.

20 Claims, 14 Drawing Sheets

(51) Int. Cl.
*F16D 65/095* (2006.01)
*F16D 55/00* (2006.01)
(52) U.S. Cl.
CPC ............... *F16D 2055/0016* (2013.01); *F16D 2250/0084* (2013.01)

(56) References Cited

U.S. PATENT DOCUMENTS

2015/0291250 A1* 10/2015 Nagai ..................... B62L 1/00
                                                    188/71.1
2018/0086415 A1    3/2018 Inase et al.

FOREIGN PATENT DOCUMENTS

| JP | 2004036799 | 2/2004 |
| JP | 2007032750 | 2/2007 |
| JP | 2014070704 | 4/2014 |

* cited by examiner

CALIPER BRACKET OF VEHICLE DISK BRAKE

CROSS-REFERENCE TO RELATED APPLICATIONS

This application is based upon and claims the benefit of priority from prior Japanese patent application Nos. 2018-187526, filed on Oct. 2, 2018 and 2019-147057, filed on Aug. 9, 2019, the entire contents of which are incorporated herein by reference.

TECHNICAL FIELD

The present disclosure relates to a caliper bracket of a vehicle disk brake, and specifically, to a caliper bracket of a vehicle disk brake detachably attached to a swing arm and configured to support a caliper body.

BACKGROUND

In the related art, there is known a caliper bracket of a vehicle disk brake attached to a swing arm on one side part of a disk rotor configured to rotate integrally with a rear wheel, and including an axle coupling part coupled to an axle, a caliper body attaching part for attaching a caliper body of a disk brake, and a swing arm coupling part coupled to the swing arm (for example, refer to JP-A-2007-32750).

However, according to the caliper bracket of a vehicle disk brake disclosed in JP-A-2007-32750, since an extension part is formed with being bent, the extension part becomes enlarged, a weight increases and a layout freedom is poor.

SUMMARY

It is therefore an object of the present disclosure to provide a caliper bracket of a vehicle disk brake making it possible to save a weight and to improve a layout freedom.

A caliper bracket of a vehicle disk brake includes an axle coupling part, an extension part, a caliper attaching part and a swing arm coupling part. The axle coupling part to be disposed on an opposite side to a disk rotor configured to rotate integrally with a rear wheel and to be attached to a rear wheel axle passing through a center of the disk rotor. The extension part extending from the axle coupling part. The caliper attaching part provided on one side part of the extension part in a longitudinal direction and provided for attaching a caliper body of a disk brake. The swing arm coupling part provided on the other side part of the extension part in the longitudinal direction and to be coupled to a swing arm. The extension part is formed to linearly extend from the axle coupling part, and the swing arm coupling part is formed to have a cuboid shape protruding toward the opposite side to the disk rotor and capable of fitting with a coupling groove member provided for the swing arm.

The swing arm coupling part may preferably be formed in parallel to the extension part.

A sectional shape of the extension part perpendicular to the longitudinal direction may preferably be a quadrangular shape, an H-shape or U-shape.

According to the caliper bracket of a vehicle disk brake of the present disclosure, the extension part is made to linearly extend from the axle coupling part, so that it is possible to suppress a width of the extension part from increasing, to save a weight of the caliper bracket and to improve a layout freedom thereof. Also, the swing arm coupling part is made to have a cuboid shape, so that it is possible to easily form the swing arm coupling part.

Also, the swing arm coupling part is provided in parallel to the extension part, so that it is possible to further suppress the width of the extension part from increasing.

Also, the sectional shape of the extension part perpendicular to the longitudinal direction is made to have a quadrangular shape, so that it is possible to easily cast the caliper bracket and to obtain a favorable outer shape. Also, the sectional shape of the extension part perpendicular to the longitudinal direction is made to have an H-shape, so that it is possible to further save the weight, and when casting the caliper bracket, it is possible to improve a running property of molten metal. Also, the sectional shape of the extension part perpendicular to the longitudinal direction is made to have a U-shape, so that it is possible to further save the weight, and when processing the extension part, it is possible to form the U-shape by cutting processing only in one direction and thus to easily process the extension part.

DETAILED DESCRIPTION

FIGS. 1 to 9 depict a first embodiment example of the present disclosure, an arrow A indicates a rotating direction of a disk rotor configured to rotate integrally with a wheel during forward travel of a vehicle, and a disk turn-out side and a disk turn-in side indicate those during the forward travel of the vehicle.

A vehicle disk brake 1 includes a disk rotor 2 configured to rotate integrally with a rear wheel, a caliper bracket 4 attached to a swing arm 3 and disposed on a side of the disk rotor 2 opposite to the rear wheel, a caliper body 6 supported to the caliper bracket 4 via slide pins 5a and 5b so as to be movable in an axial direction of a disk, and a pair of friction pads 7 and 7 disposed between an action part 6a and a reaction part 6b of the caliper body 6 while facing each other with the disk rotor 2 being interposed therebetween.

Figure 8:
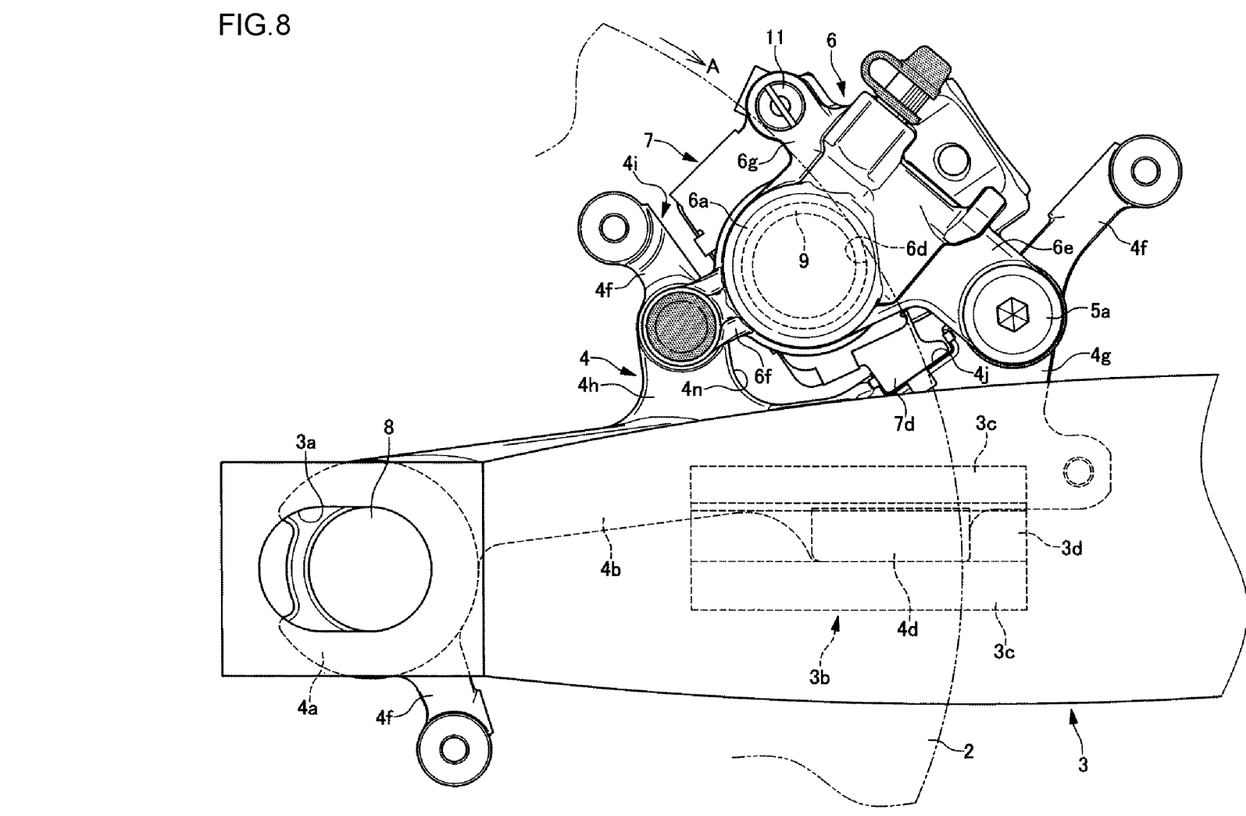
FIG. 8 is a front view of the vehicle disk brake attached to a vehicle body, depicting the first embodiment example of the present disclosure.
Figure 9:
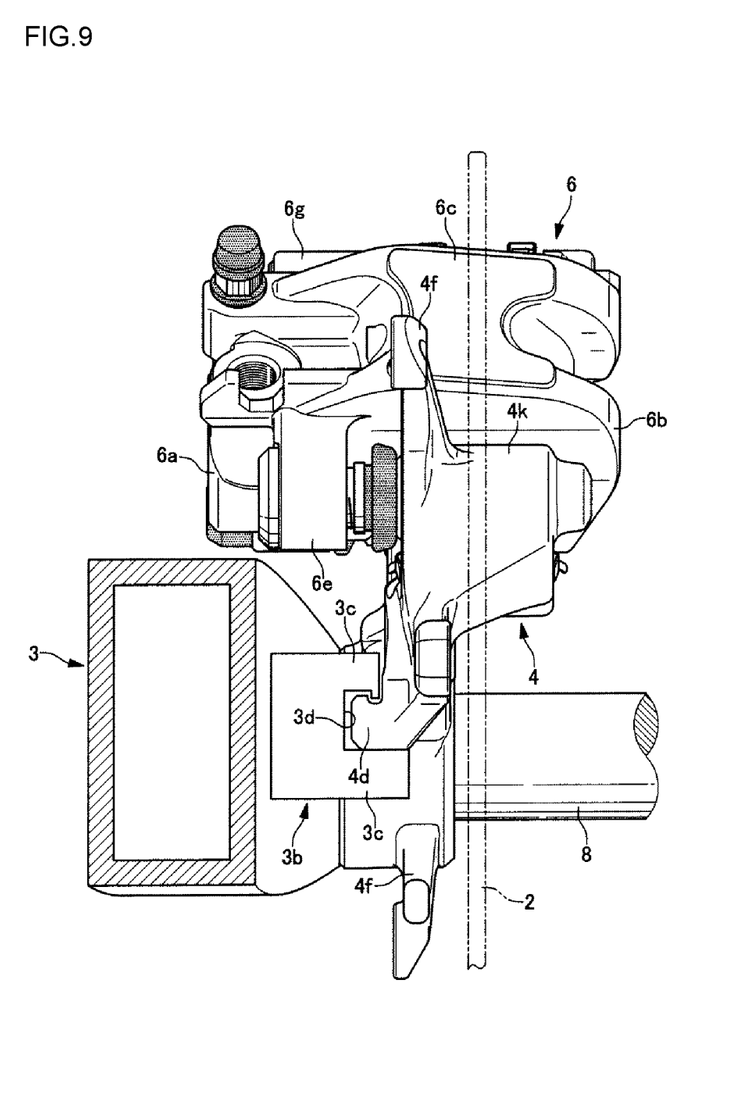
FIG. 9 is a partial sectional side view of the vehicle disk brake attached to the vehicle body, like FIG. 8.

The swing arm 3 is formed on a tip end side with an axle insertion hole 3a for inserting an axle 8 of the rear wheel, and is attached on a base end side with a coupling groove member 3b for coupling the caliper bracket 4. The coupling groove member 3b has a U-shaped section having a pair of protrusion pieces 3c and 3c parallel to the swing arm 3 and a plane part 3d coupling the protrusion pieces 3c and 3c and parallel to the swing arm 3.

Figure 5:
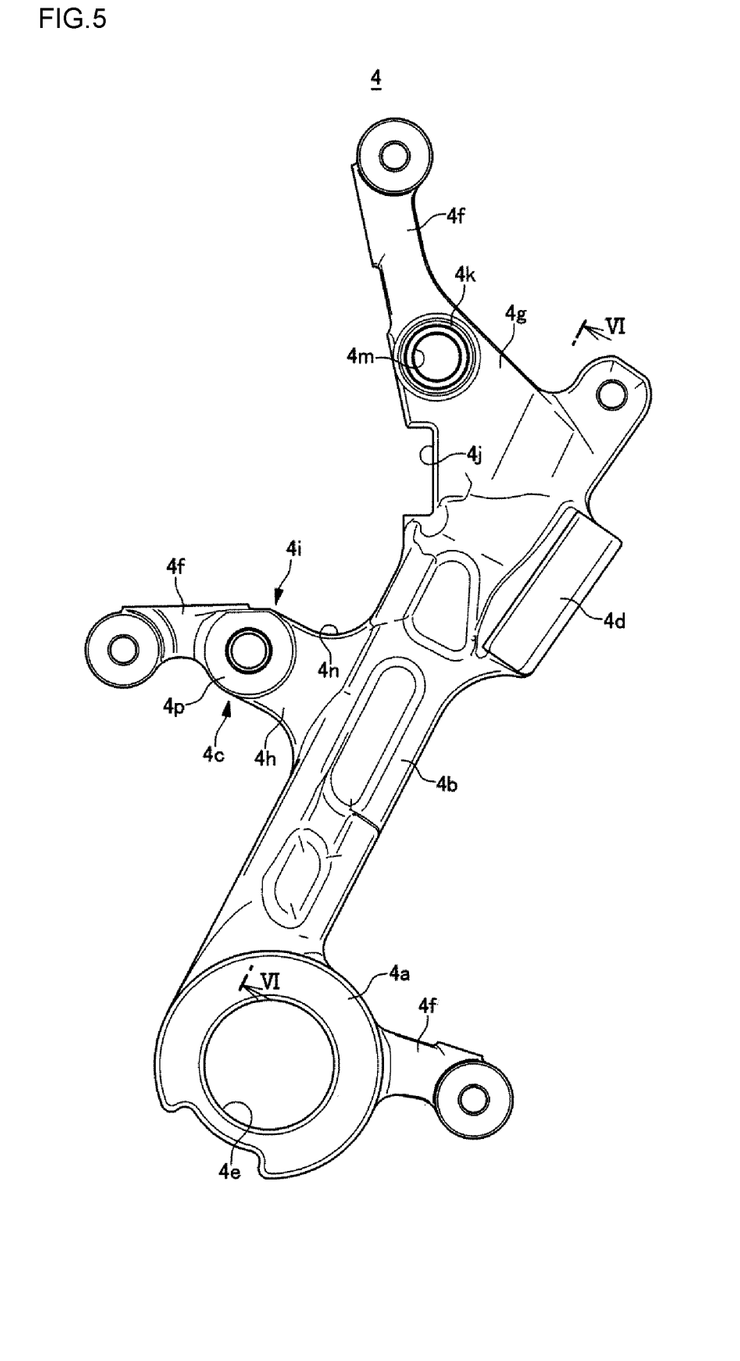
FIG. 5 is a front view of a caliper bracket, depicting the first embodiment example of the present disclosure.
Figure 6:
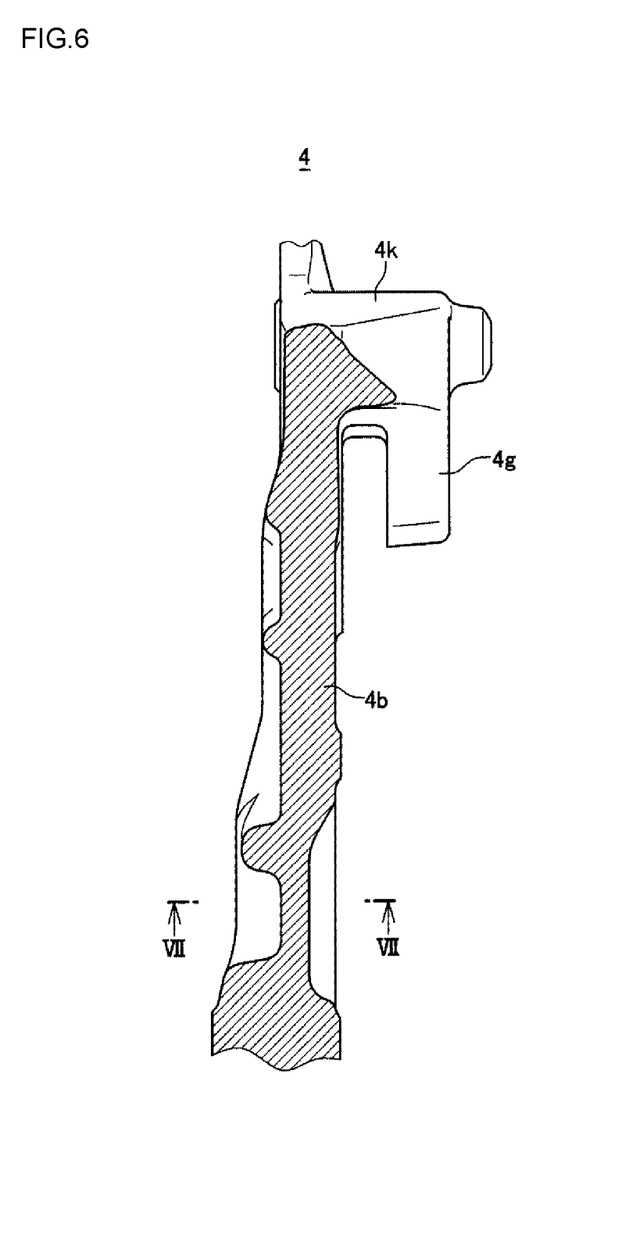
FIG. 6 is a sectional view taken along a line VI-VI of FIG. 5.
Figure 7:
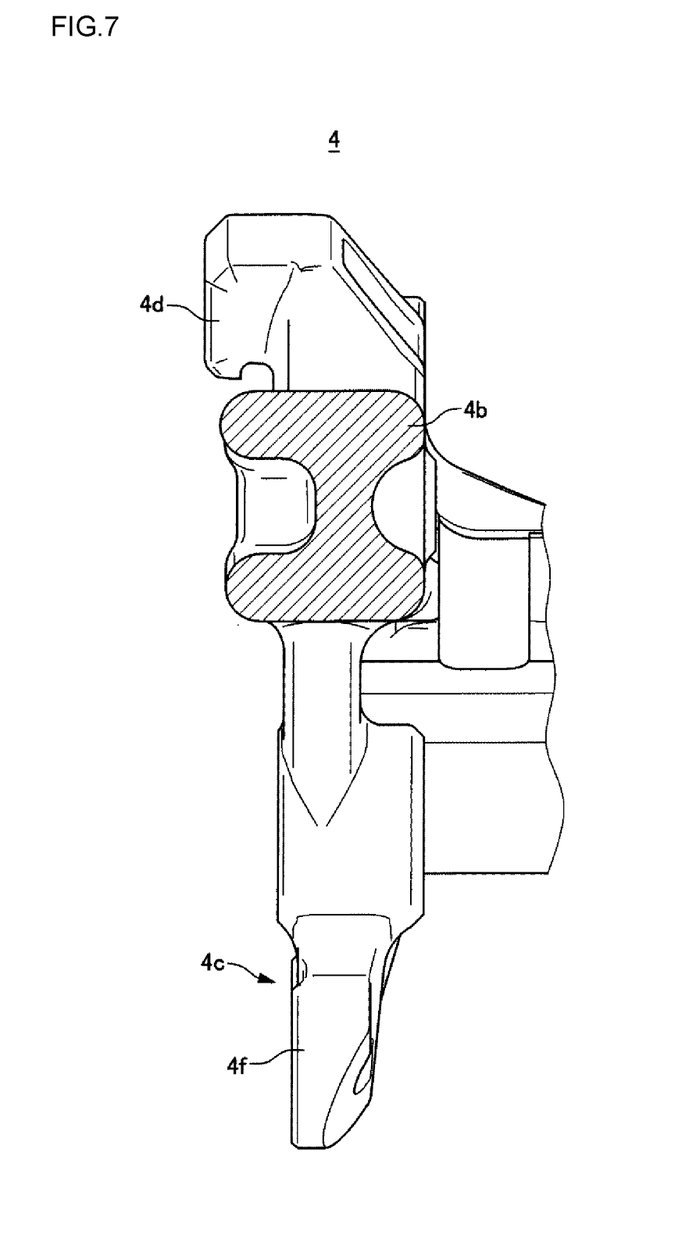
FIG. 7 is a sectional view taken along a line VII-VII of FIG. 6.

The caliper bracket 4 has an axle coupling part 4a to be coupled to the axle 8 passing through a center of the disk rotor 2, an extension part 4b extending from the axle coupling part 4a toward a disk outer periphery side, a caliper attaching part 4c provided on one side part of the extension part 4b in a longitudinal direction, and a swing arm coupling part 4d provided on the other side part of the extension part 4b in the longitudinal direction.

The axle coupling part 4a has a through-hole 4e in which the axle 8 is to be inserted, and a cover attaching arm 4f for attaching a cover configured to protect a vehicle body. The extension part 4b linearly extends from the axle coupling part 4a toward the disk outer periphery side, and a sectional shape thereof perpendicular to the longitudinal direction is an H-shape. The swing arm coupling part 4d has a cuboid shape parallel to the extension part 4b, protruding toward an opposite side to the disk rotor, and to be slidably coupled to the coupling groove member 3b.

The caliper attaching part 4c has a turn-out side caliper support arm 4g protruding from a tip end side of the extension part 4b toward an upper side of the vehicle body, a turn-in side caliper support arm 4h protruding from an intermediate part of the extension part 4b in a disk turn-in side direction with respect to the turn-out side caliper support arm 4g, and an accommodation part 4i for friction pad provided between the turn-out side caliper support arm 4g and the turn-in side caliper support arm 4h. A side surface of the turn-out side caliper support arm 4g facing toward the accommodation part is provided with a torque receiving part 4j having a U-shape, a caliper support arm 4k striding an outer periphery of the disk rotor 2 protrudes from a tip end side of the turn-out side caliper support arm 4g in the axial direction of the disk, and the caliper support arm 4k is formed with a bag-shaped slide pin insertion hole 4m. Also, the accommodation part 4i is formed so that a bottom surface 4n facing inner surfaces 7a of the friction pads 7 and 7 in a radial direction of the disk is substantially perpendicular to the extension part 4b. Also, cover attaching arms 4f protrude from tip end portions of the turn-out side caliper support arm 4g and the turn-in side caliper support arm 4h, respectively.

Figure 2:
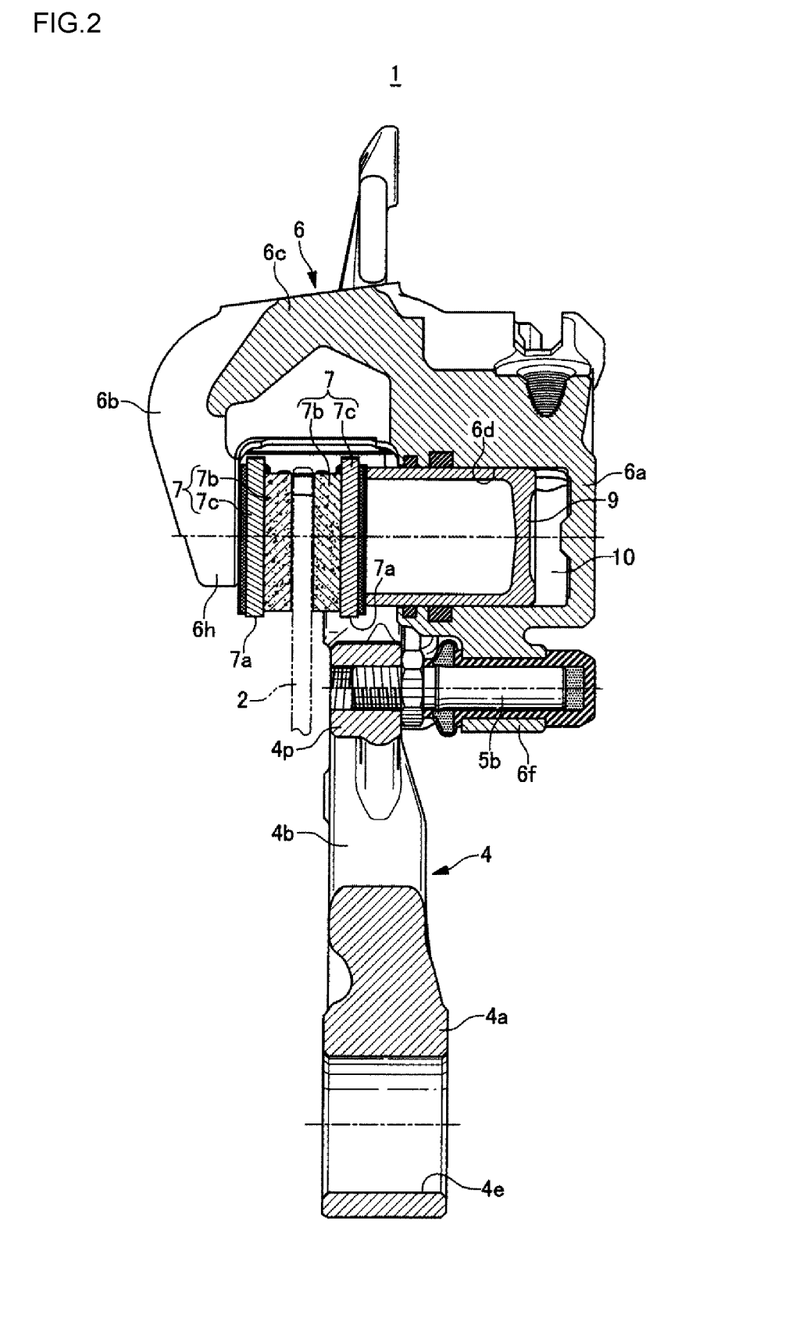
FIG. 2 is a sectional view taken along a line II-II of FIG. 1.
Figure 3:
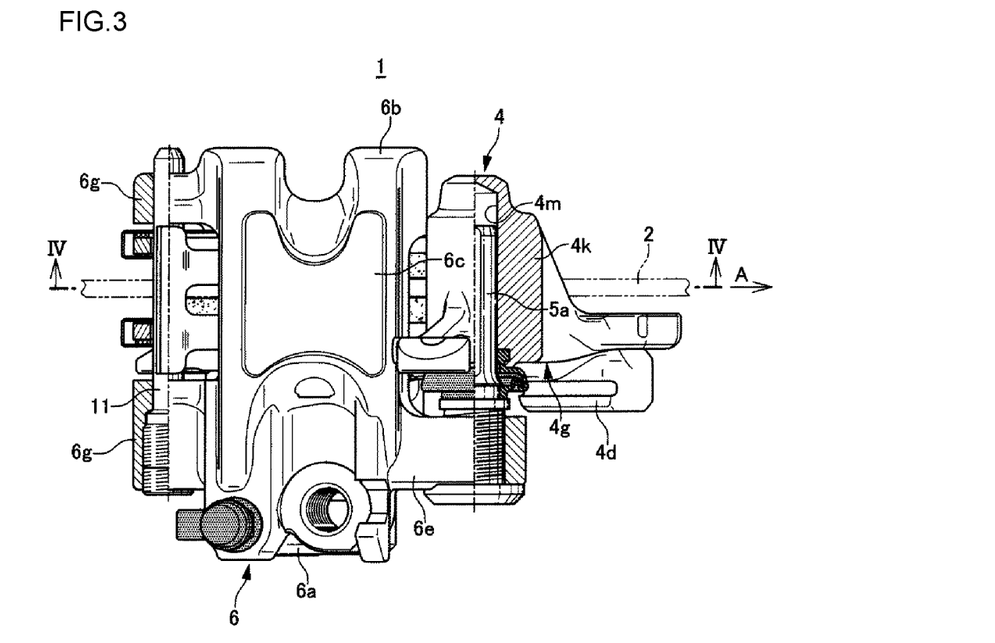
FIG. 3 is a partial sectional plan view of the vehicle disk brake, depicting the first embodiment example of the present disclosure.
Figure 4:
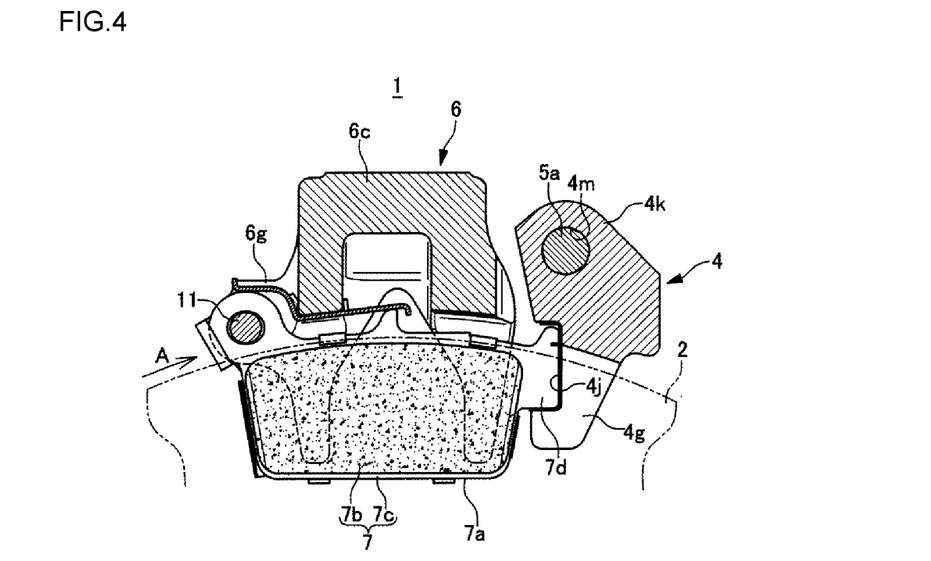
FIG. 4 is a sectional view taken along a line IV-IV of FIG. 3.

The caliper body 6 is configured by coupling the action part 6a and the reaction part 6b disposed at both sides of the disk rotor 2 by a bridge part 6c striding the outer periphery of the disk rotor 2. The action part 6a is provided with a bottomed cylinder hole 6d, and the pair of friction pads 7 and 7 is disposed between the action part 6a and the reaction part 6b while facing each other with the disk rotor 2 being interposed therebetween.

Figure 1:
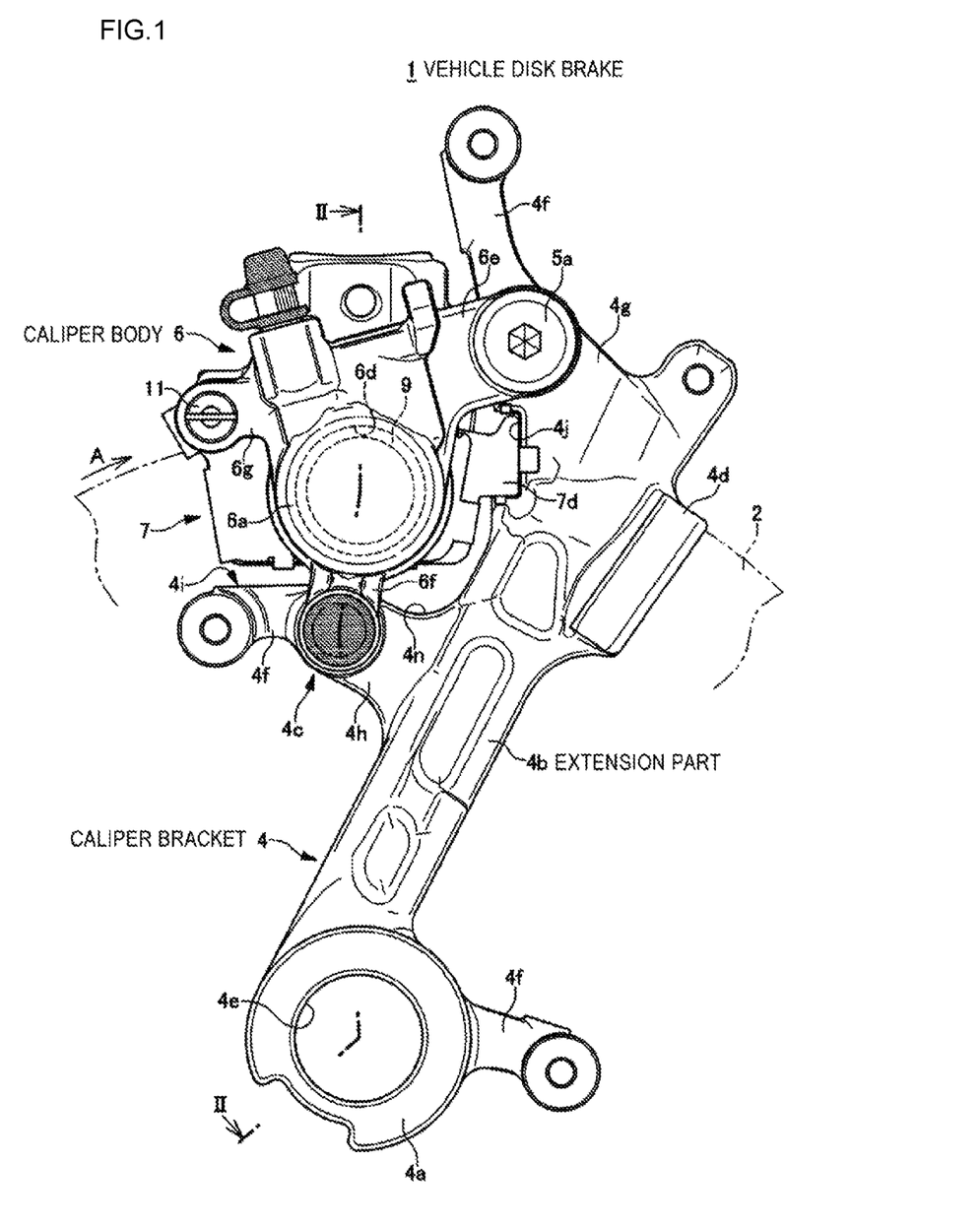
FIG. 1 is a front view of a vehicle disk brake, depicting a first embodiment example of the present disclosure.

Vehicle body mounting arms 6e and 6f protrude from the action part 6a toward the disk turn-out side and the inner side in the radial direction of the disk, and guide arms 6g and 6g protrude on the disk turn-in side of the action part 6a and the reaction part 6b. The cylinder hole 6d is formed to have a bottomed cylindrical shape with opening toward the disk rotor, a piston 9 is movably inserted therein, and a hydraulic chamber 10 is demarcated on a bottom side of the cylinder hole 6d.

The caliper body 6 is supported to be movable in an axial direction of the disk rotor by making the slide pin 5a protrude from the vehicle body mounting arm 6e toward the disk rotor, inserting the slide pin 5a in the slide pin insertion hole 4m of the caliper bracket 4, making the slide pin 5b protrude from a slide pin attaching part 4p of the caliper bracket 4 toward an opposite side to the disk rotor, and inserting the slide pin 5b in the vehicle body mounting arm 6f of the caliper body 6. Also, the reaction part 6b is provided with a reactive force claw 6h.

Each friction pad 7 is configured by bonding a lining 7b to be in sliding contact with a side surface of the disk rotor 2 to a metallic back plate 7c, and is supported to be movable in the axial direction of the disk by hanging and holding the disk turn-in side of the back plate 7c by a hanger pin 11 to be bridged to the guide arms 6g and 6g, and holding a lug piece 7d protruding toward the disk turn-out side of the back plate 7c in the torque receiving part 4j of the caliper bracket 4.

Upon the braking, when an operating fluid of which a pressure has been increased by a separate hydraulic master cylinder is supplied to the hydraulic chamber 10, the vehicle disk brake 1 formed in the above manner pushes the piston 9 toward the disk rotor, thereby pressing the friction pad 7 on the action part side to one side surface of the disk rotor 2. Subsequently, the caliper body 6 is moved toward the action part while being guided to the slide pins 5a and 5b by the reaction, and the reactive force claw 6h presses the friction pad 7 on the reaction part side to the other side surface of the disk rotor 2, so that a braking operation is performed.

As described above, according to the caliper bracket 4 of the first embodiment example, the extension part 4b linearly extends from the axle coupling part 4a toward the disk outer periphery side, and the swing arm coupling part 4d having a cuboid shape is provided in parallel to the extension part 4b, so that it is possible to suppress a width of the extension part 4b from increasing, to reduce a weight of the caliper bracket 4 and to improve layout freedom thereof. Also, the bottom surface 4n of the accommodation part 4i for the friction pad 7, which is provided for the caliper attaching part 4c, is provided perpendicularly to the extension part 4b, so that it is possible to shorten a distance between the accommodation part 4i and the swing arm coupling part 4d, and to further reduce the weight of the caliper bracket 4 and to further improve the layout freedom thereof. Also, a sectional shape of the extension part 4b perpendicular to the longitudinal direction is made to have an H-shape, so that it is possible to facilitate molding and processing of the caliper bracket 4, to save the weight and to secure the rigidity of the caliper bracket 4. Also, the accommodation part 4i provided for the caliper attaching part 4c has the bottom surface 4n, which faces the inner surfaces 7a of the friction pads 7 and 7 in the radial direction of the disk and is formed substantially perpendicularly to the extension part 4b, and the torque receiving part 4j provided on the side surface of the turn-out side caliper support arm 4g facing toward the accommodation part and configured to receive the torque from the friction pads 7 and 7. Therefore, it is possible to favorably receive the torque, which is to be applied upon the braking, with the caliper bracket 4 via the torque receiving part 4j.

FIGS. 10 to 15 depict other embodiment examples of the present disclosure. The constitutional elements, which are similar to the first embodiment example, are denoted with the same reference signs, and the detailed descriptions thereof are omitted.

Figure 10:
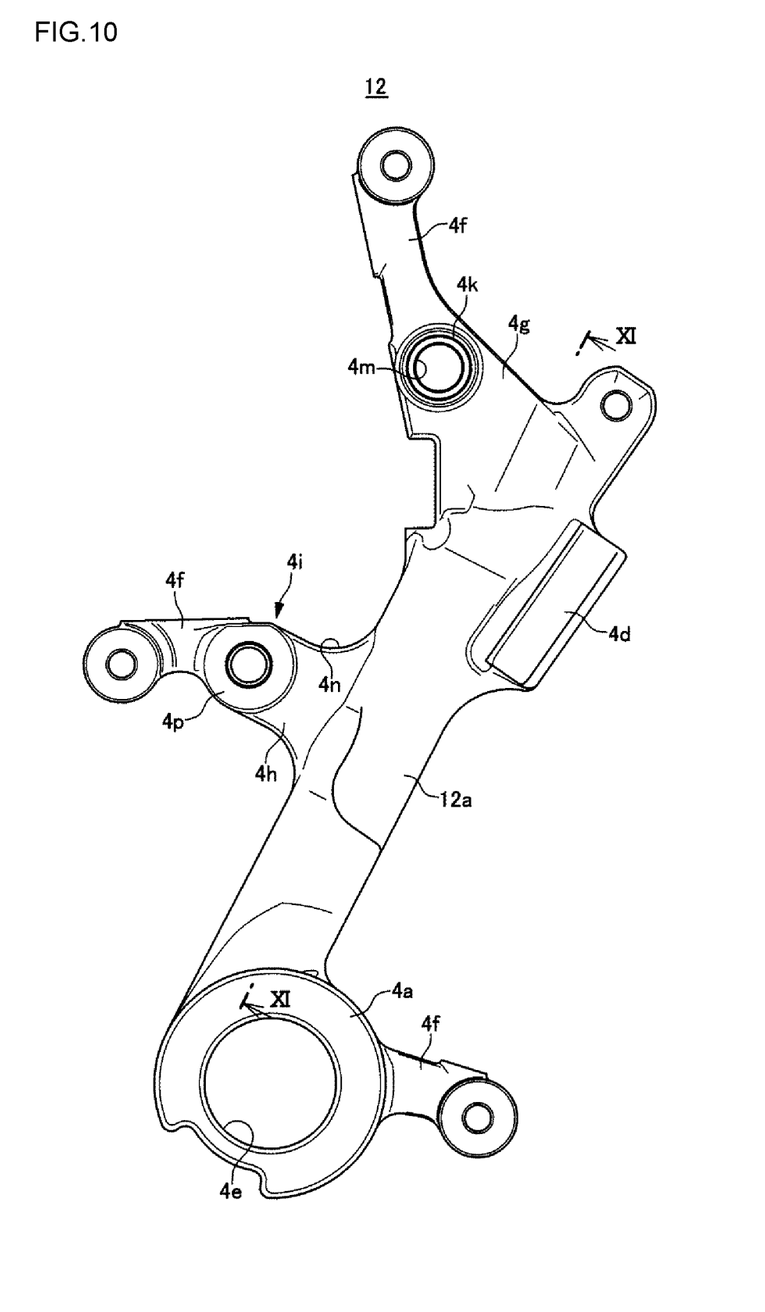
FIG. 10 is a front view of a caliper bracket, depicting a second embodiment example of the present disclosure.
Figure 11:
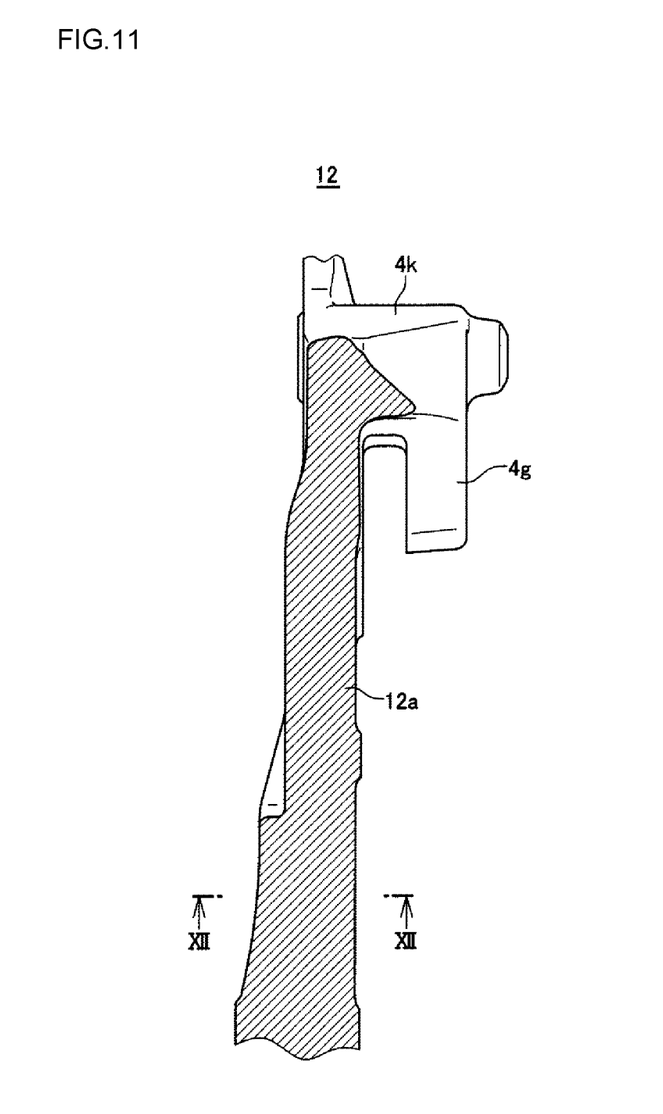
FIG. 11 is a sectional view taken along a line XI-XI of FIG. 10.
Figure 12:
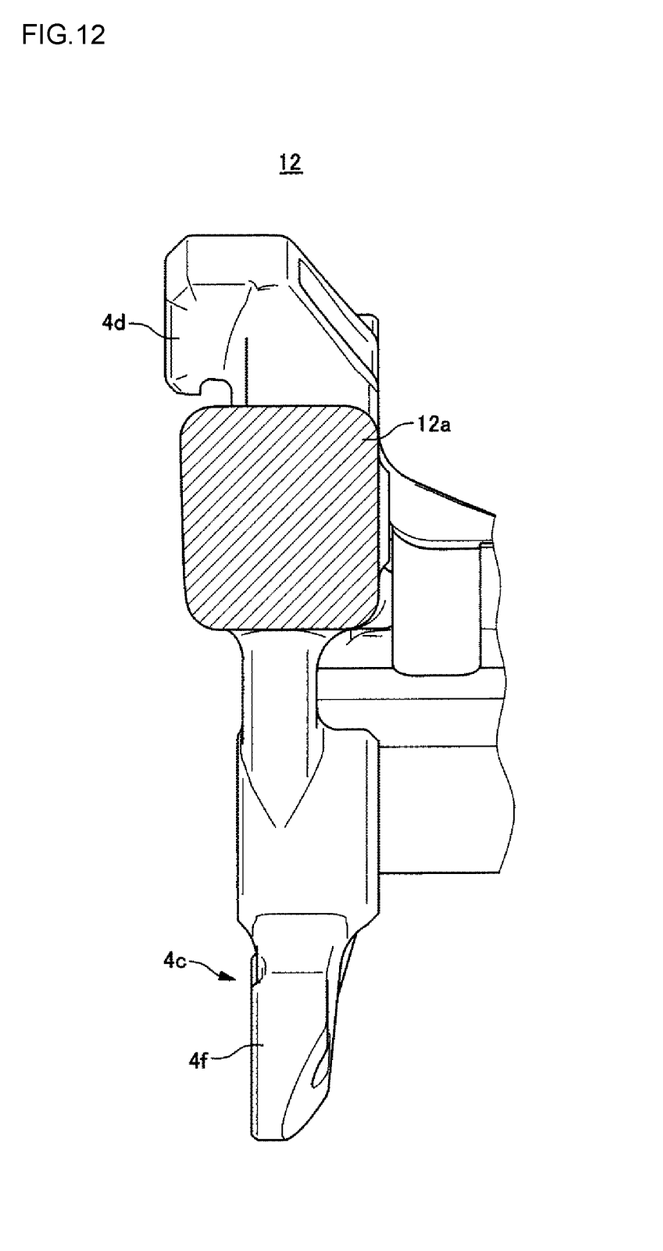
FIG. 12 is a sectional view taken along a line XII-XII of FIG. 11.

FIGS. 10 to 12 depict a second embodiment example of the present disclosure. In the second embodiment example, an extension part 12a of a caliper bracket 12 linearly extends from the axle coupling part 4a toward the disk outer periphery side, and a sectional shape perpendicular to the longitudinal direction is made to have a quadrangular shape. Thereby, it is possible to easily cast the caliper bracket 12 of the second embodiment example and to obtain a favorable outer shape.

Figure 13:
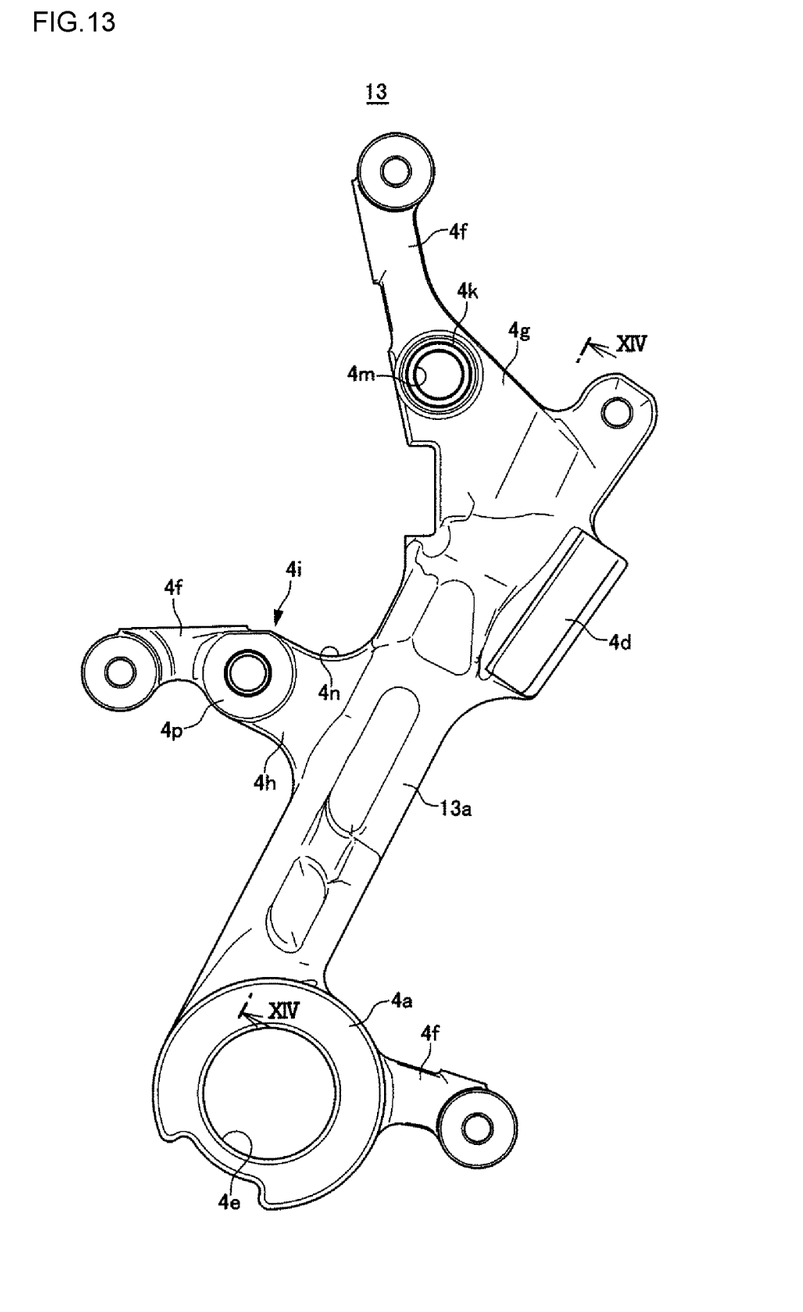
FIG. 13 is a front view of a caliper bracket, depicting a third embodiment example of the present disclosure.
Figure 14:
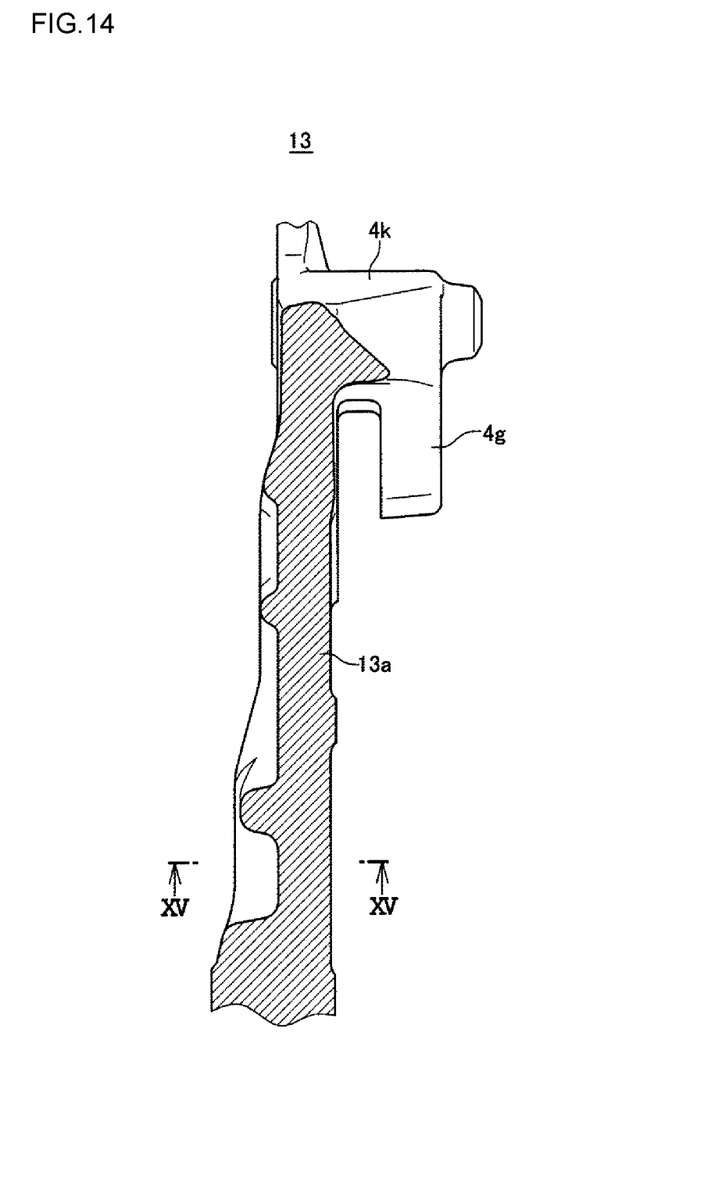
FIG. 14 is a sectional view taken along a line XIV-XIV of FIG. 13.
Figure 15:
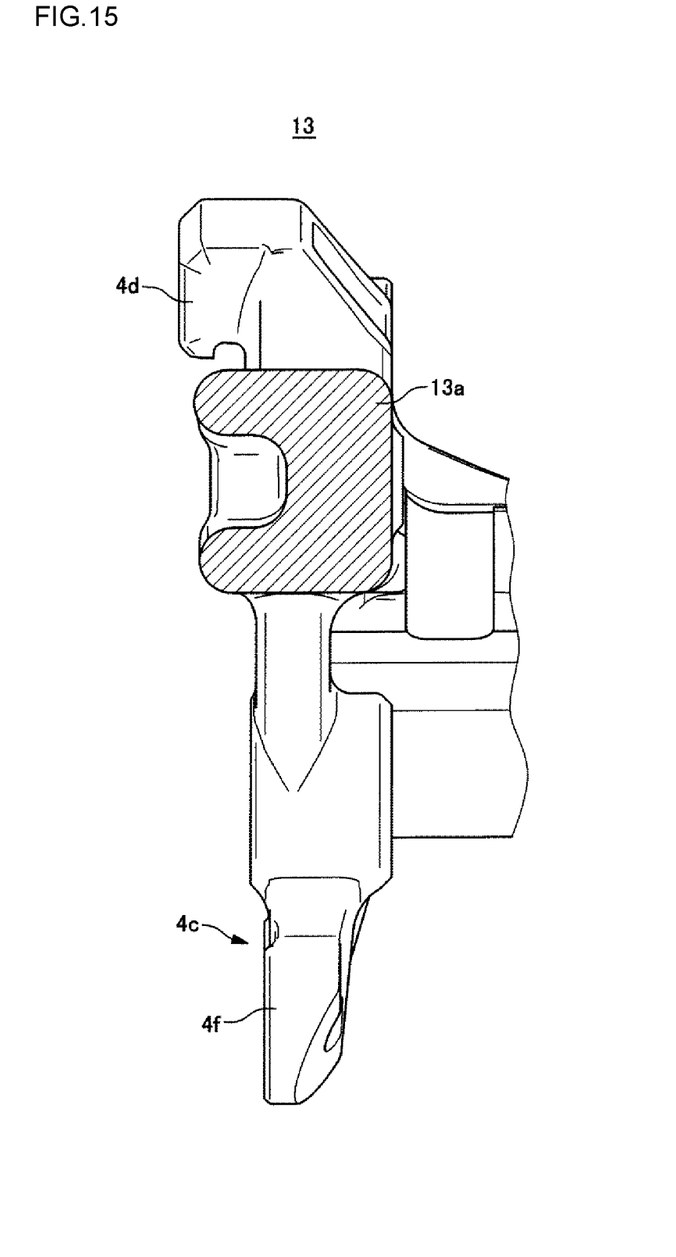
FIG. 15 is a sectional view taken along a line XV-XV of FIG. 14.

FIGS. 13 to 15 depict a third embodiment example of the present disclosure. In the third embodiment example, an extension part 13a of a caliper bracket 13 linearly extends from the axle coupling part 4a toward the disk outer periphery side, and a sectional shape perpendicular to the longitudinal direction is made to have a U-shape. Thereby, it is possible to further reduce the weight of the caliper bracket 13 of the third embodiment example. Also, when cutting the extension part 13a into a U-shape, it is possible to form the U-shape by the cutting processing only in one direction, so that it is possible to easily form the extension part.

In the meantime, the present disclosure is not limited to the embodiment examples. For example, the swing arm coupling part may not be provided in parallel to the extension part. Also, a sectional shape of the extension part perpendicular to the longitudinal direction is not limited to the H-shape, the quadrangular shape, and the U-shape. Also, the shape of the caliper body may be arbitrarily formed, and the shape of the caliper attaching part of the caliper bracket may also be appropriately changed, in correspondence to the type of the caliper body to be attached.

What is claimed is:

1. A caliper bracket of a vehicle disk brake comprising:
    an axle coupling part to be disposed on a side of a disk rotor of the vehicle disk brake opposite to a rear wheel of the vehicle, the disk roto being configured to rotate integrally with the rear wheel and to be attached to a rear wheel axle passing through a center of the disk rotor;
    an extension part extending from the axle coupling part;
    a caliper attaching part provided on one side part of the extension part in a longitudinal direction and provided for attaching a caliper body of the disk brake;
    a swing arm coupling part provided on the other side part of the extension part in the longitudinal direction and to be coupled to a swing arm,
    wherein the extension part is formed to linearly extend from the axle coupling part, and the swing arm coupling part is formed to have a cuboid shape protruding toward the opposite side to the disk rotor and capable of fitting with a coupling groove member provided for the swing arm.

2. The caliper bracket of the vehicle disk brake according to claim 1, wherein the swing arm coupling part is formed in parallel to the extension part.

3. The caliper bracket of the vehicle disk brake according to claim 2, wherein a sectional shape of the extension part perpendicular to the longitudinal direction is a quadrangular shape.

4. The caliper bracket of the vehicle disk brake according to claim 2, wherein a sectional shape of the extension part perpendicular to the longitudinal direction is an H-shape.

5. The caliper bracket of the vehicle disk brake according to claim 2, wherein a sectional shape of the extension part perpendicular to the longitudinal direction is a U-shape.

6. The caliper bracket of the vehicle disk brake according to claim 1, wherein a sectional shape of the extension part perpendicular to the longitudinal direction is a quadrangular shape.

7. The caliper bracket of the vehicle disk brake according to claim 1, wherein a sectional shape of the extension part perpendicular to the longitudinal direction is an H-shape.

8. The caliper bracket of the vehicle disk brake according to claim 1, wherein a sectional shape of the extension part perpendicular to the longitudinal direction is a U-shape.

9. The caliper bracket of the vehicle disk brake according to claim 1, wherein the caliper attaching part is provided perpendicularly to the swing arm coupling part on an opposing side of the extension part.

10. The caliper bracket of the vehicle disk brake according to claim 1, wherein the swing arm coupling part is provided on the extension part remote from a tip portion of the extension part.

11. The caliper bracket of the vehicle disk brake according to claim 1, further comprising cover attaching arms extending from the extension part, on an opposite side from the swing arm coupling part.

12. The caliper bracket of the vehicle disk brake according to claim 11, further comprising another cover attaching arm extending from the axle coupling part, on a same side of the extension part as the swing arm coupling part.

13. The caliper bracket of the vehicle disk brake according to claim 11, wherein the cover attaching arms protrude from tip end portions of a turn-out side caliper support arm and a turn-in side caliper support arm.

14. The caliper bracket of the vehicle disk brake according to claim 13, wherein the turn-out side caliper support arm and the turn-in side caliper support arm extend away from each other.

15. The caliper bracket of the vehicle disk brake according to claim 13, wherein the swing arm coupling part is located between the turn-out side caliper support arm and the turn-in side caliper support arm on an opposing side of the extension part.

16. The caliper bracket of the vehicle disk brake according to claim 13, wherein the turn-in side caliper support arm includes a slide pin attaching part extending between of the cover attaching arms and the extension part.

17. The caliper bracket of the vehicle disk brake according to claim 16, wherein the turn-in side caliper support arm includes a slide pin insertion hole extending between one of the cover attaching arms and the extension part.

18. The caliper bracket of the vehicle disk brake according to claim 13, further comprising a torque receiving part provided on a side surface of the turn-out side caliper support arm.

19. The caliper bracket of the vehicle disk brake according to claim 18, wherein the torque receiving part is an indent that is facing the turn-in side caliper support arm.

20. A caliper bracket of a vehicle disk brake comprising:
    an axle coupling part;
    an linear extension part extending from the axle coupling part;
    a caliper attaching part provided on one side part of the linear extension part in a longitudinal direction; and
    a swing arm coupling part provided on the other side part of the extension part in the longitudinal direction and positioned remotely from an end of the linear extension part, wherein the linear extension part and the caliper attaching part are offset from one another along a length of the caliper attaching part, with the caliper attaching part being perpendicular to the linear extension part.

* * * * *